United States Patent [19]
Vachtsevanos et al.

[11] Patent Number: 5,241,163
[45] Date of Patent: Aug. 31, 1993

[54] ARTICLE IDENTIFICATION APPARATUS AND METHOD USING A FERROMAGNETIC TAG

[75] Inventors: George J. Vachtsevanos, Marietta; Kent Davey, Lithonia, both of Ga.

[73] Assignee: Kleen-Tex Industries, Inc., La Grange, Ga.

[21] Appl. No.: 719,847

[22] Filed: Jun. 24, 1991

[51] Int. Cl.⁵ ............................................. G06K 7/08
[52] U.S. Cl. ................................. 235/449; 235/375; 235/493
[58] Field of Search ................... 235/375, 449, 493; 360/26

[56] References Cited

U.S. PATENT DOCUMENTS

| | | | |
|---|---|---|---|
| 3,453,598 | 7/1969 | Schweizer | 235/449 |
| 4,108,366 | 8/1978 | Genest et al. | |
| 4,281,242 | 7/1981 | Mannion | 235/449 |
| 4,523,088 | 6/1985 | Utsch et al. | |
| 4,591,991 | 5/1986 | Sticht | 235/375 |
| 4,717,816 | 1/1988 | Raymond | 235/449 |
| 4,883,949 | 11/1989 | Kokubo et al. | |

Primary Examiner—Harold Pitts
Attorney, Agent, or Firm—Jones & Askew

[57] ABSTRACT

Information is encoded on tags preferably in a form emulating conventional bar coding, in which ferromagnetic strips correspond to bars and nonferromagnetic spaces correspond to the absence of bars. The tags thus can be embedded within an article or otherwise concealed from visual scanning or inspection. The tags are read by scanning with a magnetic reader including an excitation coil and a pickup coil. Relative movement between the tags and the scanner induces a signal in the pickup coil only when a bar is scanned, so that the phase and timing of the induced signals contain information corresponding to the relative placement and width of the ferromagnetic bars and strips. Those signals are processed to provide an output signal emulating the output from a conventional optical bar code scanner.

15 Claims, 4 Drawing Sheets

ARTICLE IDENTIFICATION APPARATUS AND METHOD USING A FERROMAGNETIC TAG

FIELD OF INVENTION

This invention relates in general to identifying individual articles from a number of like or unlike articles, and relates in particular to a system utilizing ferromagnetic media for tagging and identifying articles such as industrial mats or the like.

BACKGROUND OF THE INVENTION

Certain businesses and services need to monitor the use of articles comprising their stock in trade. One obvious example is the need to monitor inventory of articles in a manufacturing environment, or in the chain of distribution from manufacture to disposition with the end user. Bar code use has become widespread for those applications, with articles or their packages bearing a visible bar-code label containing information identifying the product by such factors as model number, capacity, weight, or the like. An optical reader scans the visible bar code as desired, producing a signal which is decoded to reproduce the information previously encoded on the label. Various bar coding techniques and apparatus for reading bar codes are known to those skilled in the art.

A similar need to identify articles exists in fields other than manufacture and distribution. For example, in the rental and return of reusable articles, the need exists to identify each article and thereby create a history of use or other attributes in connection with that article. In some instances, optically-readable bar code labels can be affixed to the articles and read at various times, for example, when the article is delivered to a customer and later returned by the customer. However, the reliable operation of such bar-code labeling systems depend on a label or tag that remains visible throughout the expected lifetime of the article. This requirement makes the use of optical bar coding impracticable for applications where the encoded labels are likely to become disfigured or torn off in use.

One example of applications where optical bar coding is not feasible is the service of renting industrial mats. These mats typically are rented to customers of a mat-rental service, with the customer from time to time receiving fresh mats in place of ones that may have become soiled or worn. Mats removed from customer service are inspected for damage and wear, and are laundered for reuse with the same or other customers. Mats of any given kind and size are virtually identical and thus are indistinguishable from each other, making it difficult for the mat rental company to control its inventory of the mats. Moreover, these companies find it desirable to identify each mat with the date the mat was first put in service, the customer(s) for the mat, the service route and route driver responsible for the particular mat, the manufacturer of the mat, and other factors pertaining to the origin, durability, or rental history of the mat.

Optical bar coding has not met with favor in tagging industrial mats for identification. Bar-code labels can become damaged or removed from the mats during machine laundering, and the sometimes-harsh environments of use for such mats can disfigure or damage the labels. A proposed alternative to optical bar coding requires a radio-frequency (RF) tag attached to each mat, each tag being tuned or otherwise adapted to provide a unique electronic signature when subjected to an RF field. The costs associated with producing the required volume of uniquely-encoded RF tags and RF readers has inhibited widespread adoption of that tagging scheme.

SUMMARY OF THE INVENTION

Accordingly, it is an object of the present invention to provide an improved system for identification of articles.

It is another object of the present invention to provide an improved apparatus and method for uniquely identifying an article from a plurality of such articles.

It is a further object of the present invention to provide apparatus and method for uniquely identifying an article without requiring a visible tag associated with the article.

It is a further object of the present invention to provide apparatus and method for identifying an article and thereby producing an output signal in the nature of bar code identifying the information, so that conventional bar code electronics can read the signal.

Other objects and advantages of the present invention will become apparent from the following disclosure.

Stated in general terms, the present invention includes a tag having ferromagnetic elements encoded with information corresponding to a particular article. This tag is associated with the article, preferably embedded in the article to avoid damage as the article is handled and thus in concealment from visual inspection of the article. The invention also includes a sensor responsive to the information encoded in the tag and producing an output signal corresponding to that unique information when the sensor is placed in proximity to the tag.

Stated somewhat more specifically, the tag preferably comprises a plurality of ferromagnetic regions and gaps between those regions, the ferromagnetic regions and gaps encoding the unique information in a predetermined format. The sensor operates to sense the ferromagnetic regions and gaps, so as to produce an electrical signal corresponding to the encoded information. The ferromagnetic regions and gaps preferably are selected so that the sensor produces output signals emulating information encoded in a bar code format, whereby the output signals can be supplied to and understood by apparatus for processing such conventional bar code signals.

Stated in further detail, the sensor creates a magnetic field which is altered by the encoded tag as the sensor undergoes movement relative to the concealed tag. The ferromagnetic regions formed in the tag cause perturbations of the magnetic field, and those perturbations are detected by the sensor. An electronic circuit converts the perturbations to electrical signals corresponding to the information encoded in the tag, preferably in a bar code format. The sensor in preferred form includes an excitation coil producing the magnetic field, and a pick-up coil responsive to perturbations in the magnetic field. The pick-up coil preferably is disposed relative to the excitation coil so that substantially no magnetic flux linkage exists between the two coils unless the magnetic field is being perturbed by relative motion between the ferromagnetic strips comprising the tag.

The signal induced in the pick-up coil by perturbations of the magnetic field is compared with a reference signal, preferably the signal driving the excitation coil to produce the magnetic field, to obtain the difference between the two signals. This difference signal varies as a function of the phase and amplitude of the signal from the pick-up coil. The difference signal then is multiplied by the reference signal, producing a product signal including a component whose phase is a function of the phase relation between the difference signal and the reference signal. The phase of the product signal varies as a function of the field perturbations giving rise to the signal in the pick-up coil, and the phase and duration of the product signal thus emulates relative placement and width of the ferromagnetic strips and gaps in the ferromagnetic regions and gaps of the tag. This product signal is further processed to provide an output suitable for reading by a conventional bar code system, which reproduces the information encoded into the tag.

The nature and advantages of the present invention will become more readily apparent from the following description of the preferred embodiment.

DETAILED DESCRIPTION OF PREFERRED EMBODIMENT

Figure 1:
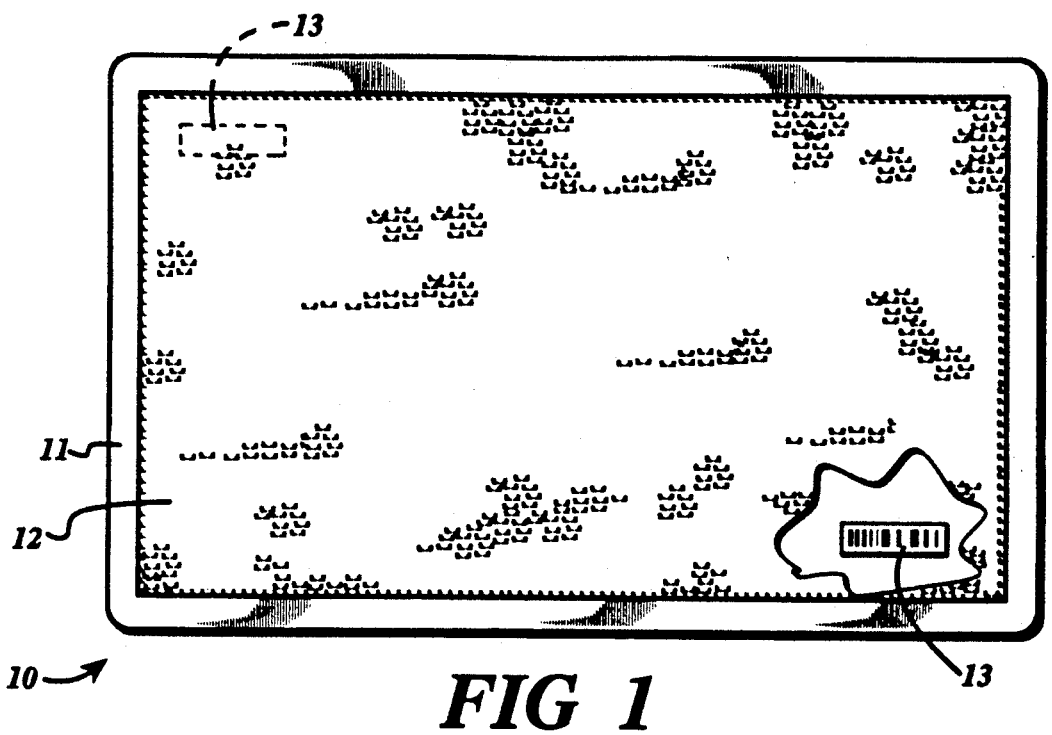
FIG. 1 is a pictorial view of a mat partially broken-away to show an embedded tag according to a preferred embodiment of the present invention.

FIG. 1 shows at 10 a mat equipped according to a preferred embodiment of the present invention. The mat 10 conventionally includes a flexible backing 11 typically fabricated from a suitable elastomeric material such as rubber or the equivalent, and an upper surface 12 usually made of fibers tufted or otherwise prepared to provide a relatively low pile. The nature and fabrication of such mats is commonplace.

Contained within the mat 10 are a pair of tags 13 each encoded with information identifying the particular mat. For example, the information encoded in the tags 13 may be an identification number unique to the particular mat. That identification number is correlated to information in a database or other source external to the tag, such as information identifying the manufacturer of the mat, the service route and route driver responsible for the particular mat, the date the mat was manufactured, and so on. Each of the two tags 13 in the mat 10 contain an identical identification and thus are redundant; the mat could contain but a single such tag although placing two tags at diagonally-opposed corners of the mat permits scanning the tag without repositioning the mat by the scanning person and thus is advantageous in the practical application of the present invention.

Figure 2:
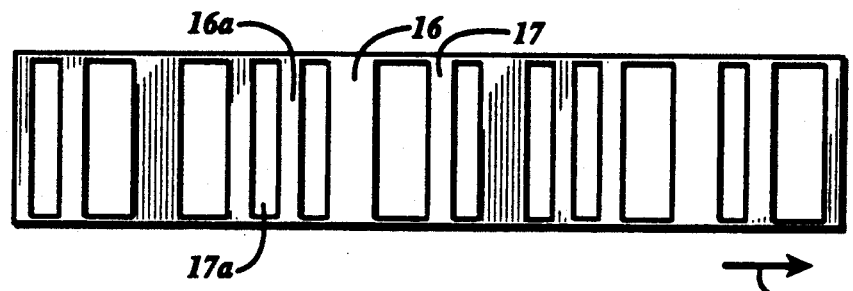
FIG. 2 is a pictorial view of the tag shown in FIG. 1.

A typical tag 13 is shown in FIG. 2 in greater detail. Information concerning the particular mat 10 is encoded in the tags 13 in a suitable bar-code format in magnetically readable form. The tag 13 thus includes magnetically-active regions or "bars" 16 of various widths, as measured along the length of the tag, separated by empty spaces 17 likewise of various widths. The tag pattern of magnetically-active strips and empty spaces preferably utilizes a conventional interleaved two of five bar code pattern to encode the information relating to the particular mat; such bar coding techniques are well known in the art. The bars 16 have a minimum width shown by the bar 16a, and the spaces likewise have that minimum width shown by the space 17a. Other bars or spaces are twice the minimum width, and the width and placement of bars and/or spaces corresponds to a particular number as known to those skilled in the art.

Because the tag 13 will be embedded within the mat 10 hidden from visual inspection, the usual black stripes and white spaces of optical bar code patterns are not used. Instead, the bars 16 of the tags 13 are magnetically active, and in the present embodiment are provided by ferromagnetic strips. Similarly, the spaces 17 are provided in the tag 13 are magnetically passive. In the preferred embodiment, the tags 13 are relatively thin and flexible metallic strips punched or otherwise formed from a mild steel such as shim stock or the like. The spaces 17 of the bar code pattern in the tags 13 are gaps punched or otherwise cut in the metallic strip, and the bars 16 are provided by the metallic regions interleaving the punched-out spaces. Those skilled in the art will recognize that the width of the bars 16 and the spaces 17 determine the bits of information numerically encoded into the tag.

The tags 13 preferably are installed in the mat 10 by embedding the tags in the elastomeric backing 11. For new mats, the tags 13 preferably are molded into the backing 11 as the mat is fabricated; being strips of steel, the tags are not damaged by the heat and pressure of the molding process. Existing mats can be retrofitted with tags by inserting the tags into a slit cut for that purpose in the elastomeric backing. After each tag is inserted, the slit is closed with a suitable sealant to preserve the structural integrity of the mat backing and to retain the tags in place through repeated laundering and other handling of the mat. The thin tags are relatively flexible and do not add undue stiffness to the mats, and also can withstand normal rough handling or laundering of the mat without breakage.

It will now be understood that each tag 13 contains information encoded by a particular sequence of bars 16 and spaces 17 formed in the individual tag associated with each mat 10. The sequence of bars and spaces is detected by apparatus including a sensor 22 best seen in FIGS. 3 and 4. The sensor 22 has a body 23 fabricated from a number of thin laminates 24 of mild steel. The laminates 24 are stacked in alignment and secured together by suitable fasteners (not shown) to maintain the steel laminates closely packed together.

Five separate slots 26 ... 30 extend inwardly from the top face 32 of the sensor body 23. The four teeth A, B, C, and D separate the slots 26-30 in sequence, and it can be seen from FIG. 4 that the top face of each tooth is coextensive with the top face 32 of the sensor body 23.

The sensor 22 contains an excitation coil 35 and a pickup coil 37. The excitation coil 35 includes four windings 35a ... 35d wound around the respective teeth A ... D of the sensor body 23. These windings 35a ... 35d are connected in series with each other, from the input lead 38 (FIG. 3) to the output lead 39. The relative polarities of the windings 35a ... 35d are shown by the directional arrows 40 in FIG. 3, which assume current flowing into the excitation coil 35 along the input lead 38 and flowing out of that coil along the output lead 39 at a particular moment. (It will be understood that the current flow will change direction at each phase change of the AC excitation signal supplied to the excitation coil 35.) Thus, the momentary current flow through the first winding 35a is in a clockwise direction around the tooth A, and thereafter flows in the counterclockwise direction through the winding 35b around tooth B. The excitation current next enters the winding 35c to flow in the clockwise direction around the tooth C, and thereafter enters the last winding 35d to flow in the counterclockwise direction around the tooth D before leaving the excitation coil through the output lead 39.

Figure 4:
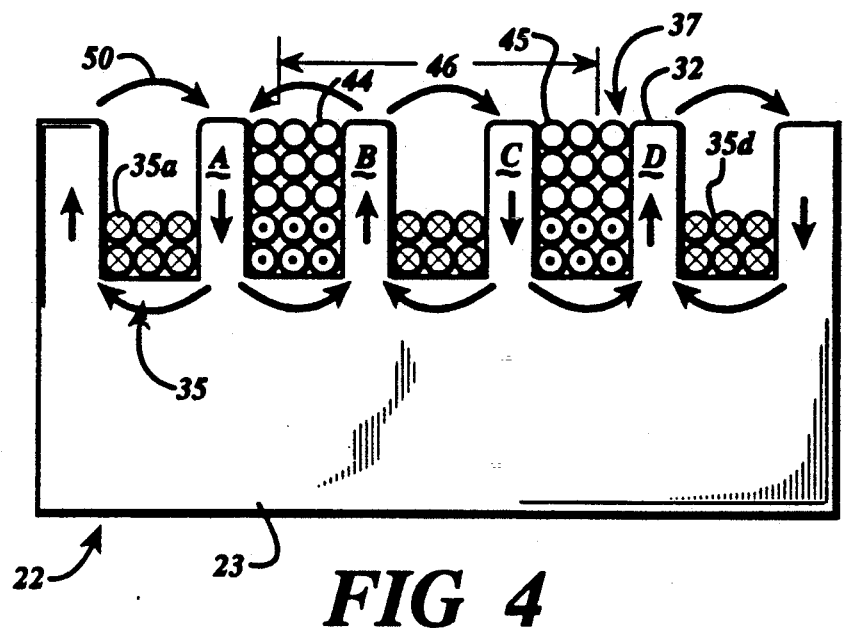
FIG. 4 is an elevation view of the sensor shown in FIG. 3.

The pickup coil 37 has a single winding with the first side 44 occupying the second slot 27 of the sensor body 23 and the second side 45 occupying the fourth slot 29 of that body. The pickup coil 37 thus bridges the third slot 28. Referring to FIG. 4, it is seen that the second slot 27 and fourth slot 29 contain windings of both the excitation and pickup coils, while the three remaining slots contain windings only of the excitation coil.

Figure 3:
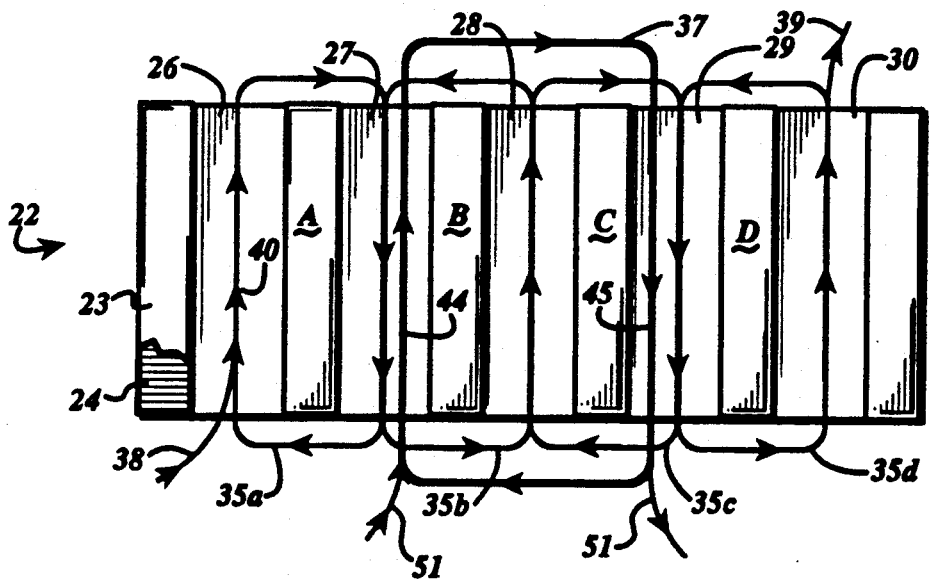
FIG. 3 is a plan view, partially cut away for illustration, of a sensor according to the preferred embodiment, for detecting the information encoded in the tags.

The pitch of the sensor 22, that is, the spacing between adjacent teeth and slots, depends on the width of the narrowest bar and space utilized in the tag 13. For proper operation of the preferred embodiment, the width 46 of the pickup coil 37—that is, the spacing between the same points on the first side 44 and second side 45 of the pickup coil—is identical to the width of the narrowest bar 16a or narrowest space 17a on a tag 13. (For illustrative purposes, FIGS. 3 and 4 are drawn to a scale larger than FIG. 2, but the distance 46 shown on those latter two figures is identical to the width of the narrowest bars 16a and spaces 17a on a tag.)

The wavelength of the excitation coil 35 is the distance from one positive current-carrying slot such as the first slot 26, to the next positive slot such as the third slot 28. It is important in realizing a high sensitivity that the width of the pickup coil 37 be equal to the wavelength of the excitation coil. Thus, there normally is no voltage induced in the pickup coil by the excitation coil, as explained below. By choosing the excitation wavelength to be half the width of the narrowest bar 16a, the interaction of the bar with the excitation field produces a perturbation field which exactly matches that of the pickup coil. By obtaining the difference between the pickup and reference signals and then multiplying that difference by the excitation signal, the phase of the perturbation signal is extracted without requiring the use of bridge nulling. (The conventional technique of monitoring such a tag is to observe the inductance change as seen through the excitation coil. Such inductance measurements are usually approached through bridge nulling.) Because the field of the excitation coil has no flux linkage with the pickup coil, maximum sensitivity is obtained inasmuch as the pickup coil is not concerned with measuring a small quantity superimposed on a larger one. The present detection technique thus is simpler and more robust than conventional null detection systems.

The wavelength of the excitation coil is chosen to be large enough to deal with the maximum anticipated separation between the excitation coil and the tag. The magnetic field decreases exponentially as the ratio of the distance to the field wavelength increases.

The excitation coil 35 of the sensor 22 is connected to receive a 5 kHz excitation signal, as explained below in greater detail. The alternating-current excitation signal flowing through the windings of the excitation coil 35 produces magnetic flux which is concentrated along the paths of minimum reluctance, represented by the laminated steel body 23. The lines 50, FIG. 4, represent the magnetic flux produced by the windings of the excitation coil 35 at a time when the excitation current flows in the direction 40 (FIG. 3) such that current flowing through the portion of winding 35a in the slot 26 is represented as flowing into the plane of the paper in FIG. 4 and flowing out of the paper in the portion of that winding contained in the second slot 27. This current flow through the excitation winding 35a produces flux lines 50 flowing in a generally clockwise direction around the first slot 26, and flowing across the open top of that slot so as to enter the tooth A between the first and second slots 26 and 27.

As the excitation current leaves the first winding 35a and flows through the second winding 35b, that second winding produces flux lines which flow upwardly through the tooth B. Some of that magnetic flux flows across the second slot 27 and downwardly into the tooth A, reinforcing the flux from the winding 35a. The other half of the flux from the winding 35b bridges the third slot 28 and enters the tooth C of the sensor body.

In a similar manner, the flow of excitation current through the windings 35c and 35d produce magnetic flux flowing into the tooth C of the body, and flowing outwardly from the tooth D thereof, all as illustrated by the flux lines 50 in FIG. 4. Each of the excitation coil windings 35a . . . 35d contains an equal number of turns, and the magnetic flux produced by each winding thus is substantially equal. Moreover, the width of the teeth A . . . D is equal. As a result, the flux density entering or leaving each individual tooth A . . . D is substantially the same in magnitude.

Under the operating conditions of the sensor 22 as described thus far, no voltage is induced in the pickup coil 37 by the fundamental frequency of an excitation signal flowing through the excitation coil 35. Referring again to FIG. 4, the windings in both the first side 44 and the second side 45 of the pickup coil 37 are cut by flux lines 50 flowing in the same direction. As mentioned avove, these flux lines are of equal magnitude, and the flux lines induce in the pickup coil a voltage equal to the rate of change of the total flux linkage. The voltages instantaneously induced in the two sides of the pickup coil 37 have the same magnitude and polarity, and thus no total induced voltage appears across the output leads 51 (FIG. 3) of that coil when the field is not perturbed. The sensor 22 thus produces no output voltage under the quiescent operating condition depicted in FIG. 4, where the excitation coil 35 is active but nothing perturbs the flux lines 50 produced by the windings 35a . . . 35d of the excitation coil.

The pick-up coil 37 does receive an induced AC signal from a first-order harmonic of the excitation signal. This harmonic signal in the pick-up coil is eliminated as explained below.

Figure 5A:
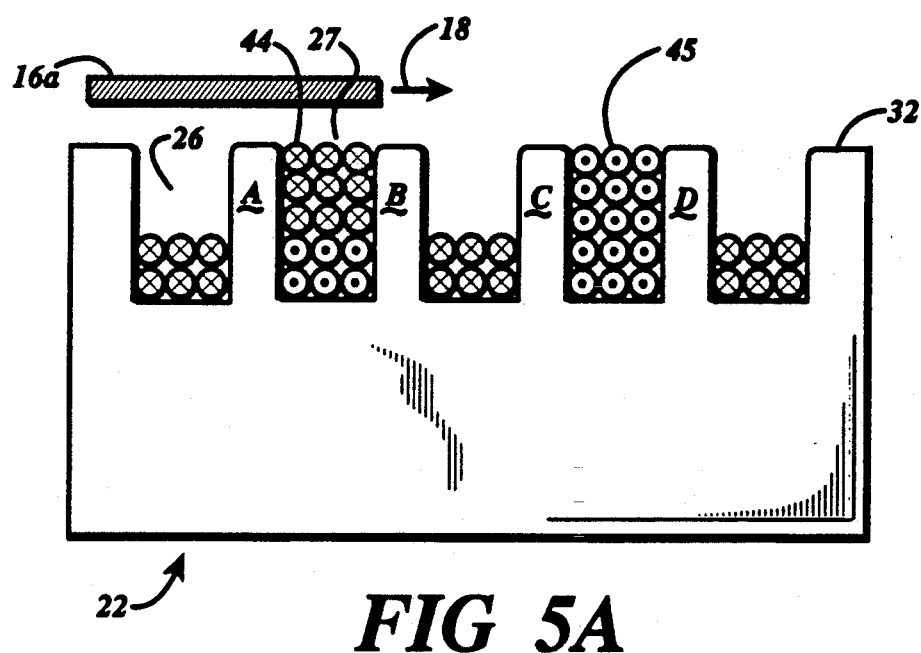
FIGS. 5A-5C show the sensor of FIG. 4 at three different times during detention of a ferromagnetic bar in the tag.

FIG. 5A represents the condition where a narrowest bar 16a of the tag 13 is moving past the surface 32 of the sensor 22, at a distance from that surface of no more than the width of one of the slots in the surface. Although the movement arrow 18 in FIG. 5A shows the bar 16a of a tag moving relative to the sensor 22, it should be understood that in actual practice the sensor 22 is placed on the surface of the mat backing 11 and is moved relative to the mat and the embedded tag containing the bar. The operation of the method and apparatus described herein requires only relative motion between the tag and the sensor. As the ferromagnetic bar 16a moves into the position where that bar becomes substantially centered over tooth A and bridges the first slot 26 and first slot 27, the magnetic flux flowing outwardly from the tooth B no longer divides equally in flowing toward the teeth A and C. Instead, the ferromagnetic bar 16a represents a path of reduced reluctance to the flux flowing from the tooth B, such that more than half of that flux now flows through the bar 16a and enters the tooth A. Consequently, a lesser amount of the flux from the tooth B (produced by winding 35b of the excitation coil) flows toward the tooth C as the bar 16a at the position shown in FIG. 5A perturbs the magnetic flux produced by the windings of the excitation coil. This perturbation disturbs the previously-balanced lines of flux cutting the first side 44 and second side 45 of the excitation coil, inducing in that coil a voltage of a first polarity depending on the polarity of the excitation signal. With the assumed polarity and flux direction of the excitation signal as shown by the arrows 40 in FIG. 3, a positive-going voltage is produced in the pickup coil 37 as the bar 16a begins movement relative to the sensor as illustrated in FIG. 5A.

Figure 5B:
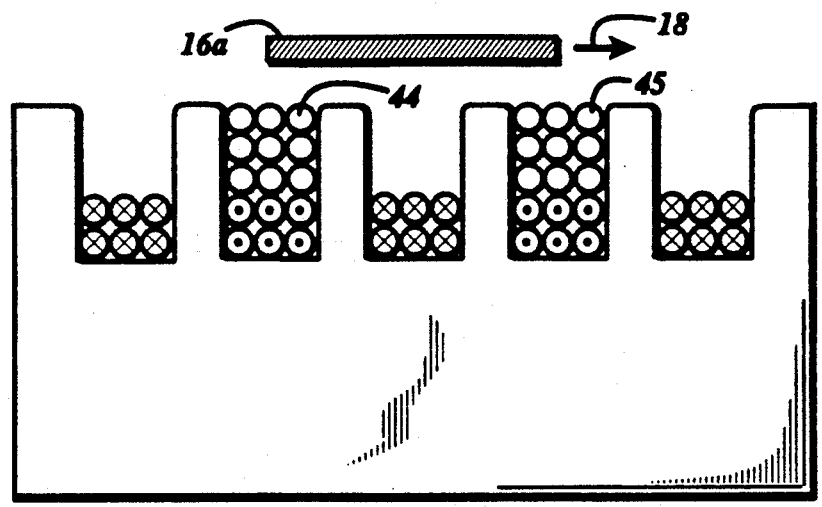

Continued movement of the bar 16a relative to the sensor 22 places that bar at the midpoint of the sensor, a condition illustrated in FIG. 5B. With the bar 16a at the midpoint, the magnetic flux induced in the sides 44 and 45 of the excitation coil returns to a balanced state and the movement-induced voltage across the pickup coil returns to zero.

Figure 5C:
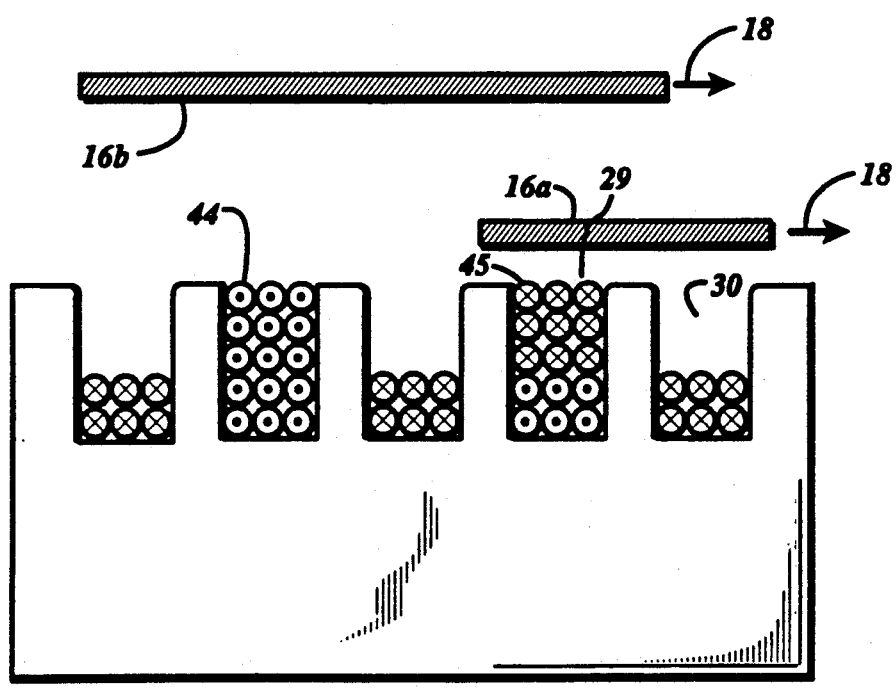

Continued relative movement of the bar 16a places that bar at the position shown in FIG. 5C, where the bar is substantially centered above the tooth D and bridges the fourth slot 29 and fifth slot 30 of the sensor. The bar 16a thus provides a low-reluctance path for the flux flowing from the tooth D, unbalancing the flux cutting the first side 44 and second side 45 of the pickup coil and again inducing a voltage across that coil. However, it will be understood that the voltage produced in the pickup coil at the time illustrated in FIG. 5C is of opposite polarity from the pickup-coil voltage induced at the condition shown in FIG. 5A. This negative-going induced voltage peaks as the bar 16a reaches the position shown in FIG. 5C, and then returns to zero as the bar moves beyond the sensor 22 and no longer perturbs the magnetic field produced by the excitation coil.

Recapping the operation of the sensor as it traverses a narrowest bar 16 of the tag 13, that bar induces a positive output voltage in the pickup coil as the bar first perturbs the magnetic field, as illustrated in FIG. 5A. The voltage induced in the pickup coil returns to zero as the sensor 22 moves to a balanced position relative to the narrowest bar 16a, the condition illustrated in FIG. 5B. The induced voltage in the pickup coil goes negative as continued relative movement places the narrowest bar 16a at the position shown in FIG. 5C, and that induced voltage again returns to zero when the bar leaves the magnetic field of the sensor. Assuming the relative motion 18 between the sensor 22 and the bar 16a is constant, the positive-going and negative-going voltages induced in the pickup coil are sinusoidal with a period determined by the velocity of movement. Because the width of the narrowest bar 16a is the same as the width or wavelength 46 (FIG. 4) of the pickup coil, the voltage induced in that pickup coil crosses the zero point with substantially no zero-voltage dwell time at the position shown in FIG. 5B.

As pointed out previously, the bars 16 and spaces 17 of the tag 13 vary in width, the shortest of those bars being represented at 16a. If the sensor 22 moves across a bar 16b (FIG. 5C) twice the width of the narrowest bar 16a, the relative movement of that bar first induces a positive voltage in the pickup coil, followed by a negative induced voltage as the bar 16b moves to the right of a balanced position relative to the pickup coil. However, because the width of the bar 16a is twice the width or wavelength 46 of the pickup coil, the flux cut by the first side 44 and second side 45 of the pickup coil remains balanced as the bar 16b moves through the central position relative to the sensor 22, a condition illustrated in FIG. 5C. As a result, movement of the sensor 22 at a constant velocity across the wider bar 16b of the tag 13 produces in the pickup coil a positive voltage pulse, followed by a dwell time of zero voltage as the wider bar moves across the windings of the pickup coil, followed by a negative voltage pulse. Again, the period of this positive-negative output signal and the duration of the zero-voltage dwell depends on the width of the bar and the relative velocity of the sensor relative to the bar.

A space 17 moving across the sensor produces no induced voltage in the pickup coil. The duration of that zero-voltage condition thus emulates the width of the space on the tag.

It should now be apparent that the amplitude and phase of the voltage induced in the pickup coil as the sensor 22 moves across a tag 13 depends on the placement of bars 16 and spaces 17 in the tag, and on the relative widths of those bars and spaces. Thus, movement relative to each narrowest bar 16a induces in the pickup coil a voltage rising from a zero starting point to a maximum positive level, then returning to zero and with substantially no dwell at zero reaching a maximum negative level, and then returning again to zero. Assuming a constant relative velocity and uniform spacing between the bar and the top surface 32 of the sensor body, the level of that induced voltage is substantially a sinusoid of variable width dictated by the width of the bars 16, it being understood that the positive and negative halves of that sinusoidal wave form is comprised by the AC excitation voltage coupled into the pickup coil from the excitation coil. With the foregoing in mind, it becomes apparent that for each scan of a tag 13 by the sensor 22, the presence and phase of a signal in the pickup coil indicates a bar, the amount of dwell time (or the absence thereof) between phase segments of each bar signal is a function of the bar width, and the presence and extent of dwell time (i.e., no induced voltage) is a function of the presence and width of spaces 17 in the tag. The sequence and timing of those signals thus emulates the pattern of bars and spaces on the tag, and contains the information initially encoded into the tag 13.

Figure 6:
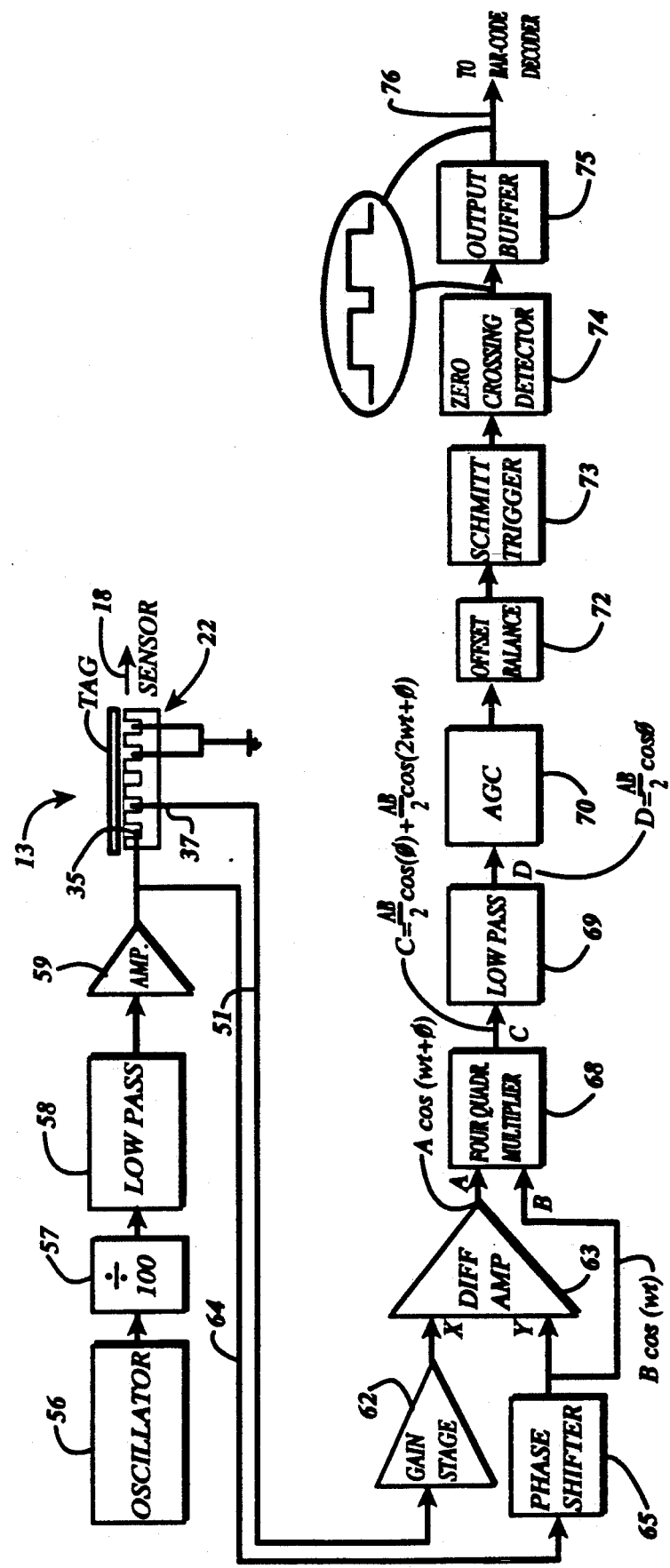
FIG. 6 is a block diagram of signal decoding apparatus according to the preferred embodiment.

Apparatus for converting the output signals induced in the pickup coil 37 into signals emulating the output of a conventional bar-code reader is shown in FIG. 6. The 5 kHz signal driving the excitation coil 35 is provided by a square wave oscillator 56 operating at 500 kHz. The output frequency of the oscillator 56 is divided by 100 at the divider 57 to yield a 5 kHz signal which goes to the fourth-order low pass filter 58 to produce a 5 kHz sine wave. That latter signal is supplied to the amplifier 59 to drive the excitation coil 35 without loading the circuit producing the 5 kHz sine wave.

The output of the excitation coil 37, which includes the first-order harmonics of the excitation signal as well as motion-induced voltages corresponding to bars 16, passes along the output line to the gain stage 62 which supplies one input of the differential amplifier 63. The other input of that differential amplifier is a constant 5 kHz reference signal supplied along the line 64 by way of the phase shifter 65. The phase shifter 65 adjusts the phase of the reference signal 180 degrees relative to the output signal from the pickup coil.

The gain stage 62 adjusts the level of the signal from the pickup coil to be equal in magnitude to the level of the reference signal. The signals supplied to the inputs X and Y of the differential amplifier 63 thus are equal in magnitude and 180 degrees out of phase with each other, in the absence of any induced signal caused by a bar 16 sensed by the pickup coil of the sensor 22. As a result, the output from the differential amplifier 63, represented by the formula $A=(y-x)\cos(\omega+\emptyset)$, is zero in the absence of a bar. The angle $\emptyset$ represents the positive or negative state of the bar-induced signals in the pickup coil and is either zero degrees or 180 degrees. The output A of the differential amplifier 63 thus departs from zero whenever a bar of the tag 13 perturbs the magnetic field produced by the excitation coil 35.

The output of the differential amplifier 63 is supplied as one input A to the multiplier circuit 68. The B input to that multiplier is the output from the phase shifter 65, here identified as B cos ($\omega t$). The multiplier 68 multiplies the inputs A and B, producing an output C represented by the formula:

$$C = \frac{AB}{2}\cos\emptyset + \frac{AB}{2}\cos(2\omega t + \emptyset)$$

The first portion of the signal C thus is a function only of $\emptyset$, the phase of the signal induced in the pickup coil by relative movement of a bar 16. The second component of C is a combined function of $\emptyset$ and of the excitation signal. Of course, the output C is zero whenever the output A from the differential amplifier 63 is zero, that is, in the absence of a bar sensed by the pickup coil in the sensor 22.

The output C is supplied to the low pass filter 69 which removes the high-frequency components of the signal, resulting in the output D as follows:

$$D = \frac{AB}{2}\cos\emptyset$$

The output D is a function only of the phase of signals induced in the pickup coil by relative movement of bars 16. Because $\emptyset$ is either zero degrees or 180 degrees depending on whether the voltage induced in the pickup coil by relative movement of a bar 16 is positive or negative, the output D thus is a positive or negative DC voltage according to the phase angle $\emptyset$ and independent of the 5 kHz signal driving the excitation coil of the sensor.

The output D from the low pass filter 69 goes to the automatic gain control (AGC) circuit 70 which adjusts the signal level to minimize differences in the magnitudes of signals induced in the pickup coil by individual tags 13. For example, some tags may be more deeply embedded than others within the backing 11 of a mat, increasing the distance between the tag and the sensor 22 when scanned, thereby reducing magnetic coupling between the tag and the flux lines 50 from the excitation coil and correspondingly reducing the amplitude of the voltage thereby induced in the pickup coil.

The gain-adjusted signal from the AGC circuit goes to the offset balance circuit 72 which maintains the nominal reference level of the DC signal level always at the same predetermined point. This predetermined point may be slightly offset from zero in the absence of a signal from the differential amplifier 63, and overcomes the tendency of the level of DC circuits to drift over time.

The output from the offset balance circuit 72 is supplied to a Schmitt trigger 73 which functions in the conventional manner to provide a predetermined DC output voltage whenever the magnitude of the input signal rises to a certain level. The threshold of the Schmitt trigger 73 is set just above zero voltage. The Schmitt trigger 73 thus provides an output voltage independent of any fluctuations in the input voltage over the trigger voltage.

The output of the Schmitt trigger is applied to the zero crossing detector 74 which is thereby triggered to generate a TTL signal in the form of a square wave whose positive components correspond to the presence and width of bars 16, and whose null values correspond to the presence and width of spaces 17. The output from the zero-crossing detector thus emulates the pattern of bars and spaces contained on the tag 13. The zero crossing detector preferably is triggered by signals whose magnitude is slightly offset from true zero voltage. The output of the zero crossing detector 74 goes to the output buffer amplifier 75, providing an output on the line 76 which emulates the output signal of an optical bar code reader scanning a visual bar code label having a pattern of dark bars and white spaces corresponding to the bars 16 and spaces 17 on the ferromagnetic tag 13. The output on the line 76 thus can be fed to any conventional bar code reader for decoding the information encoded in the tag 13. Such bar code readers are conventional and known to those skilled in the art, and the details of such readers need not be disclosed herein.

It is thus seen that the present invention provides an identification system capable of encoding information in a manner emulating bar coding but not requiring a tag or label available for visual scanning. The tag thus can be embedded within an article or otherwise concealed from view, so long as the tag is capable of scanning by a suitable nonoptical technique to determine the existence and spatial relation of bars and spaces containing the information encoded in the tag. The present identification system reproduces that information in a format emulating conventional bar code signals, so that the system is usable with conventional bar code systems and does not rely on specialized or proprietary schemes for encoding and decoding information.

It should also be understood that the foregoing relates only to a preferred embodiment of the present invention, and that numerous modifications and changes therein may be made without departing from the spirit or scope of the invention as defined in the following claims.

We claim:

1. Apparatus for identifying an article from a plurality of such articles, comprising:
   a tag associated with a particular article and concealed from visual inspection;

the tag comprising a unique pattern of ferromagnetic strips interleaved with nonferromagnetic spaces to encode information pertaining to that particular article;

the widths of the individual strips and spaces being variables within at least two multiples of a certain minimum width, and the pattern of said strips and spaces encoding the information according to a predetermined format;

sensing means separate from the article and comprising an excitation coil operative in response to an excitation signal to produce a magnetic field over a region of the tag including at least one such strip or space when the sensing means is in proximate relation to the concealed tag, so that relative motion between the magnetic field and the pattern of strips and spaces produces a perturbation field responsive to the width and ferromagnetic nature of each strip or space; and the sensing means also comprises a pick-up coil in which is induced a signal in response to the perturbation field, so that the signal induced in the pick-up coil by moving the sensing means along the tag is a functon of the width of each individual feromagnetic strip and nonferromagnetic space, and of the interleaved pattern of strips and spaces defined in the tag, whereby the induced signal corresponds to the information encoded on the tag and corresponding to the article.

2. Apparatus as in claim 1, wherein:

the pick-up coil has a width equal to the width of the narrowest individual strip or space in the pattern of the top; and the excitation coil is disposed relative to the pick-up coil so that substantially no signal is induced in the pick-up coil except in response to the perturbation field produced by relative motion between the magnetic field and the tag.

3. Apparatus as in claim 1, wherein:

the excitation coil and pick-up coil are fixed relative to each other so that both coils must move in unison relative to the tag.

4. Apparatus as in claim 1, wherein:

the excitation coil is disposed relative to the pick-up coil so that substantially no excitation signal is coupled to the pick-up coil unless the magnetic field is perturbed by a ferromagnetic strip in the magnetic field.

5. Apparatus as in claim 1, wherein:

the sensing means comprises a body having a plurality of elements;

the pick-up coil being disposed around two of the elements; and the excitation coil being disposed in relation to the pick-up coil so that substantially no excitation signal from the excitation coil is induced in the pick-up coil in the absence of a perturbation of the field by a ferromagnetic strip.

6. Apparatus as in claim 5, wherein:

the width of the pick-up coil along the body is substantially equal to the mininum width of the strips and spaces.

7. Apparatus as in claim 1, wherein:

the sensing means comprises a linear body having a plurality of finger elements spaced equidistant apart along the body;

the distance between two adjacent finger elements being one-half the minimum width of the strips and spaces;

the pick-up coil is disposed around a pair of adjacent finger elements so that the distance along the body between opposite sides of the pick-up coil is equal to the minimum width;

the excitation coil comprises a first portion disposed on a finger element beyond one side of the pick-up coil and a second portion disposed on the finger element at one side of the pick-up coil;

the excitation coil further comprises a third portion disposed on the finger element at the other side of the pick-up coil and a fourth portion disposed on the finger element beyond the other side of the pick-up coil; and the excitation coil produces a magnetic field inducing a current in one side of the pick-up coil which cancels the current induced in the other side of the pick-up coil by the excitation coil, so that no current is induced in the pick-up coil unless the magnetic field is perturbed by the pattern of strips in the magnetic field.

8. Apparatus as in claim 1, wherein:

the sensing means comprises a linear body having a plurality of poles spaced equidistant apart along the body;

the distance between two adjacent poles being one-half the minimum width of the strips;

the pick-up coil is disposed around the two adjacent poles so that the distance along the body between opposite sides of the pick-up coil is equal to the minimum width of the strips;

the excitation coil comprises a first pair of windings operative to produce a first magnetic field in the pole at one side of the pick-up coil;

the excitation coil comprises a second pair of windings operative to produce a second magnetic field in the pole at the other side of the pick-up coil; and the first magnetic field is equal in magnitude and opposite in polarity relative to the second magnetic field, so that the magnetic fields induce no current in the pick-up coil unless the magnetic fields become unalike due to perturbation by a strip in at least one magnetic field.

9. Apparatus for uniquely identifying a floor mat from a plurality of such articles, comprising:

a tag carried by the mat in concealment from visual inspection;

the tag comprising a plurality of ferromagnetic regions and nonferromagnetic spaces between the ferromagnetic regions, the widths of the individual regions and spaces being variable within at least two multiples of a certain minimum width so as to encode the tag with information in a predetermined format corresponding to that particular article; and sensing means separate from the tag and comprising a magnetic sensor responsive to the ferromagnetic regions and nonferromagnetic spaces of the concealed tag and operative to produce an output signal corresponding to the unique information encoded in the tag when the sensing means is moved in predetermined proximity relative to the tag, so that the output signal from the sensing means identifies the unique article.

10. Apparatus as in claim 9, wherein:

the tag comprises a plurality of ferromagnetic regions and spaces between the ferromagnetic regions to encode the information in a predetermined format; and the sensing means is operative to sense the spaces and regions so as to produce an electrical signal corresponding to the encoded information.

11. Apparatus as in claim 9, wherein:

the mat has a flexible elastomeric backing; and the tag is embedded within the backing.

12. Apparatus as in claim 11, wherein:

the tag comprises a thin strip of metal having a longitudinal dimension;

the tag having a plurality of gaps extending transverse to the longitudinal dimension, the gaps being interleaved with metallic strips; and the width of the gaps and strips being whole multiples of a certain minimum width so that the gaps and strips when arranged in a particular pattern along the strip can convey unique information.

13. The method of decoding bar code information encoded as an array of ferromagnetic regions interleaved with nonferromagnetic regions, the widths of the individual ferromagnetic and nonferromagnetic regions being variable within at least two multiples of a certain minimum width and the location and width of the regions determining the information according to a predetermined format, comprising the steps of:

providing an array encoded with information in the form of said ferromagnetic and nonferromagnetic region;

moving the array relative to a magnetic field produced by a reference signal so that the ferromagnetic regions perturb the field;

detecting the perturbations to produce a first signal sequentially corresponding to the perturbations of ferromagnetic regions and to the absence of perturbation by nonferromagnetic regions in the array;

obtaining the difference between the first signal and the reference signal to produce a difference signal comprising amplitude and phase components of the perturbations producing the first signal;

obtaining the product of the difference signal and the reference signal to produce an output signal whose phase is a function only of the phase difference between the difference signal and the reference signal, and thus is a function of the duration and width of the ferromagnetic and nonferromagnetic regions in the array of the bar code information; and using the output signal as an emulation of signals in the predetermined format to read the encoded information.

14. Apparatus for decoding information encoded in a bar code format as an array of ferromagnetic regions and nonferromagnetic regions, the regions varying in extent according to the information, comprising:

sensing means receiving a reference signal to form a magnetic field sensible by the array and producing a signal whose phase and amplitude vary in response to perturbations in the magnetic field by the array;

differential means responsive to the output signal and the reference signal to produce a difference signal as a function of phase and amplitude differences therebetween; and multiplier means responsive to the difference signal and the reference signal to produce a product signal whose phase is a function of the phase difference between the differential signal and the reference signal, and thus is a function of the encoded information.

15. Apparatus as in claim 14, further comprising:

means shifting the phase of the reference signal to the differential means so that the output from the differential means is zero in the absence of perturbations in the magnetic field;

the multiplier means produces, in response to nonzero outputs of the differential means, the product signal having a DC component the phase and duration of which are a function of the presence and width of a ferromagnetic region, and an AC signal component; and filter means responsive to the output of the multiplier means and operative to pass only the DC component, so that the output of the filter means comprises DC levels whose phase is a function of the ferromagnetic strip and zero levels corresponding to the nonferromagnetic regions.

* * * * *